(12) United States Patent
Chen et al.

(10) Patent No.: US 8,662,289 B2
(45) Date of Patent: Mar. 4, 2014

(54) GLASS SUBSTRATE TRANSMISSION DEVICE AND METHOD FOR DETECTING THE ROTATIONAL SYNCHRONIZATION OF DRIVEN SHAFTS

(75) Inventors: Zenghong Chen, Guandong (CN); Chunhao Wu, Guandong (CN); Kunhsien Lin, Guandong (CN); Xiande Li, Guandong (CN); Yongqiang Wang, Guandong (CN); Weibing Yang, Guandong (CN); Minghu Qi, Guandong (CN); Zhenhua Guo, Guandong (CN); Yunshao Jiang, Guandong (CN)

(73) Assignee: Shenzhen China Star Optoelectronics Technlogy co., Ltd., Shenzhen, Guangdong (CN)

( * ) Notice: Subject to any disclaimer, the term of this patent is extended or adjusted under 35 U.S.C. 154(b) by 50 days.

(21) Appl. No.: 13/578,257

(22) PCT Filed: Jun. 28, 2012

(86) PCT No.: PCT/CN2012/077728
§ 371 (c)(1),
(2), (4) Date: Aug. 10, 2012

(87) PCT Pub. No.: WO2014/000216
PCT Pub. Date: Jan. 3, 2014

(65) Prior Publication Data
US 2013/0341160 A1 Dec. 26, 2013

(30) Foreign Application Priority Data

Jun. 26, 2012 (CN) .......................... 2012 1 0213624

(51) Int. Cl.
*B65G 13/06* (2006.01)

(52) U.S. Cl.
USPC ..................... 198/783; 198/832; 198/781.06

(58) Field of Classification Search
USPC ...................... 198/783, 832, 781.06
See application file for complete search history.

(56) References Cited

U.S. PATENT DOCUMENTS

| | | | | |
|---|---|---|---|---|
| 5,373,880 A * | 12/1994 | Koster | ........................... | 144/363 |
| 6,834,758 B2 * | 12/2004 | Nguyen et al. | ................ | 198/782 |
| 8,365,903 B2 * | 2/2013 | Schmidt et al. | ............... | 198/788 |
| 8,402,802 B2 * | 3/2013 | Kuchi et al. | ...................... | 72/251 |
| 2004/0074739 A1 * | 4/2004 | Nguyen et al. | ................ | 198/782 |
| 2011/0155539 A1 * | 6/2011 | Schmidt et al. | ............... | 198/608 |

* cited by examiner

*Primary Examiner* — Leslie A Nicholson, III
*Assistant Examiner* — Keith R Campbell
(74) *Attorney, Agent, or Firm* — Andrew C. Cheng

(57) ABSTRACT

The present invention provides a glass substrate transmission device and a method for detecting the rotational synchronization of driven shafts. The device comprising: multiple driven shafts, the multiple driven shafts are disposed parallel at intervals along a first direction and each of the driven shafts has a through hole at the first direction; multiple rollers fixed at intervals on the driven shafts for carrying a glass substrate, and rotate with the driven shaft to flow the glass substrate; a reflection; an infrared sensor unit emitting the infrared and receives a reflection light reflected back by an obstacles and emitted by the infrared sensor unit, and determine the rotational synchronization of the driven shafts according to the value of the intensity of the reflected light. The through holes and the reflection plate are located at the propagation direction of the infrared of the infrared sensor unit. By above way, the present invention can timely detect that if the multiple driven shafts rotate synchronously or stop rotating to avoid the glass substrate from scratch or break.

19 Claims, 4 Drawing Sheets

GLASS SUBSTRATE TRANSMISSION DEVICE AND METHOD FOR DETECTING THE ROTATIONAL SYNCHRONIZATION OF DRIVEN SHAFTS

BACKGROUND OF THE INVENTION

1. Field of the Invention

The present invention relates to the display technology, and more particular to a glass substrate transmission device and a method for detecting the rotational synchronization of driven shafts.

2. Description of Related Art

In the LCD panel production process, it uses the conveyor as the transmission device to flow the TFT-LCD glass substrate. Currently, the transmission device use low-dust and anti-static rollers composed of POM or Teflon to transmit the glass substrate.

In transmission process of the glass substrate, it requires a smooth flow, no jitter, no deviation of flow, and no scratches of the glass substrate. Therefore, each of the driven shafts must rotate at the same speed to meet the above requirement, and each contact point with the glass substrate of each of the rollers must in the same contour surface.

It usually can use adjustment method to ensure that the height of the contact points with the glass substrate of the rollers are within the permissible error range, but each driven shaft may be affected by magnetic main drive shaft, site impact as well as sudden changes in temperature and other factors so that it can not guarantee the synchronization.

The glass substrate depends on rolling friction to transmit. In the transmission process, when a driven shaft stop rotating due to failure or the speed is not synchronized with other driven shafts, the point of the roller on the driven shafts contacting the glass substrate produce sliding friction.

On one hand, when the sliding friction is much larger than the rolling friction, it may marks or scratches the glass substrate. On the other hand, the new sliding friction destroy the force balance of the glass substrate and cause the glass substrate to jitter and flow resulting in the fragments of glass substrate.

When each driven shaft rotation is not synchronized to produce sliding friction, it is difficult to detect with the naked eye and hard to discover on time. It is often aware to repair equipment when fragments or defective of the products have happened.

Therefore, it is necessary to provide a glass substrate transmission device and a method for detecting synchronization of the driven shafts to solve the conventional art which can not rapidly detect that if the driven shafts rotate synchronously.

SUMMARY OF THE INVENTION

The main problem solved by present invention is to provide a glass substrate transmission device and a method for detecting the rotational synchronization of driven shafts. The glass substrate transmission device and the method or detecting the rotational synchronization of driven shafts can automatically and timely detect that if the multiple driven shafts rotate synchronously.

To solve these technical problems, the technical solution used in this invention is providing a glass substrate transmission device comprising:

multiple driven shafts, the multiple driven shafts are disposed parallel at intervals alone a first direction and extend along a second direction, and each of the driven shafts has a through hole, and the first direction and the second direction are perpendicular;

multiple rollers, the multiple rollers are fixed at intervals on the driven shafts along the second direction, and the multiple rollers are used for carrying a glass substrate, and rotate with the driven shaft to flow the glass substrate;

a reflection plate disposed at one side of the driven shafts along the first direction; and an infrared sensor unit disposed at the other side of the driven shafts along the first direction, and the through holes and the reflection plate are located at the propagation direction of the infrared of the infrared sensor unit, and the infrared sensor unit emits the infrared and receives a reflection light reflected back by an obstacles and emitted by the infrared sensor unit, and determine the rotational synchronization of the driven shafts according to the value of the intensity of the reflected light.

Wherein, the infrared sensor unit comprises:

a transmitter module used for emitting the infrared;

a receiver module used for receiving the reflection light emitted by the transmitter module and reflected back by the obstacle; and a determining module connected to the receiver module and determining that if the multiple driven shafts rotate synchronously according to the intensity or the reflected light.

Wherein, the determining module determines the distance of the obstacle according to the intensity of the reflected light, and the stronger the intensity of the reflected light, the closer the distance of the obstacle is.

Wherein, the determining module stores multiple preset values of the intensify of the reflected light, and each of the preset values of the intensity of the reflected light is respectively corresponding to the intensity value of the infrared which is passing through the driven shafts, emitted by the infrared transmitter module, and reflected by the reflection plate, and the determining module determines that if the intensity value of the reflected light and the preset values of the intensity of the reflected light corresponding to the reflection plate are matched, and in the situation of match, the determining module determines that the multiple driven shafts rotate synchronously, and in the situation of mismatch, the determining module determines that the multiple driven shafts rotate asynchronously.

Wherein, when determining that the multiple driven shafts rotate asynchronously, the determining module searches the matched preset values of the intensity of the reflected light, according to the intensity value of the reflected light, and determines that the one of the driven shafts corresponding to the matched preset values of the intensity of the reflected light rotates asynchronously.

Wherein, the infrared sensor unit further comprises an alarm module, and when the determining module determines that the multiple driven shafts rotate asynchronously, the alarm module produces an alarm.

Wherein, the size of the through hole is decided according to the diameter of the driven shaft and the requirement of the infrared.

To solve these technical problems, another technical solution used in this invention is to provide a glass substrate transmission device comprising:

multiple driven shafts, the multiple driven shafts are disposed parallel at intervals along a first direction and extend along a second direction, and each of the driven shafts has a through hole, and the first direction and the second direction are perpendicular;

multiple rollers, the multiple rollers are fixed at intervals on the driven shafts along the second direction, and the multiple rollers are used for carrying a glass substrate, and rotate with the driven shaft to flow the glass substrate;

a drive unit used to drive the multiple driven shafts to rotate;

a reflection plate disposed at one side of the driven shafts along the first direction; and an infrared sensor unit disposed at the other side of the driven shafts along the first direction, and the through holes and the reflection plate are located at the propagation direction of the infrared of the infrared sensor unit, and the infrared sensor unit emits the infrared and receives a reflection light, reflected back by an obstacles and emitted by the infrared sensor unit, and determine the rotational synchronization of the driven shafts according to the value of the intensity of the reflected light.

Wherein, the infrared sensor unit comprises:

a transmitter module used for emitting the infrared;

a receiver module used for receiving the reflection light emitted by the transmitter module and reflected back by the obstacle; and a determining module connected to the receiver module and determining that if the multiple driven shafts rotate synchronously according to the intensity of the reflected light.

Wherein, the determining module determines the distance of the obstacle according to the intensity of the reflected light, and the stronger the intensity of the reflected light, the closer the distance of the obstacle is.

Wherein, the determining module stores multiple preset values of the intensity of the reflected light, and each of the preset values of the intensity of the reflected light is respectively corresponding to the intensity value of the infrared which is passing through the driven shafts, emitted by the infrared transmitter module, and reflected by the reflection plate, and the determining module determines that lithe intensity value of the reflected light and the preset values of the intensity of the reflected light corresponding to the reflection plate are matched, and in the situation of match, the determining module determines that the multiple driven shafts rotate synchronously, and in the situation of mismatch, the determining module determines that the multiple driven shafts rotate asynchronously.

Wherein, when determining that the multiple driven shafts rotate asynchronously, the determining module searches the matched preset values of the intensity of the reflected light according to the intensity value of the reflected light, and determines that the one of the driven shafts corresponding to the matched preset values of the intensity of the reflected light rotates asynchronously.

Wherein, the infrared sensor unit further comprises an alarm nodule, and when the determining module determines that the multiple driven shafts rotate asynchronously, the alarm module produces an alarm.

Wherein, the drive unit comprises:

a main drive shaft, and the main drive shaft is rotatable;

multiple main drive wheels having magnetism, and the multiple main drive wheels are fixed at intervals on the main drive shaft and along the extension direction of the main drive shaft, and the main drive wheels rotate with the rotation of the main drive shaft; and multiple driven wheels having magnetism, and each of the driven wheels is fixed at one end of the driven shaft which is non-through-hole area and closed to the main drive shaft, and the driven wheels are driven to rotate by the main drive wheels through magnetic coupling, and the driven wheels drive the driven shafts to rotate.

Wherein, the multiple driven shafts are disposed at intervals along the extension direction of the main drive shaft, and the extension direction of the driven shafts is perpendicular to the extension direction of the main drive shaft.

To solve these technical problems, another technical solution used in this invention is to provide a method for detecting the rotational synchronization of multiple driven shafts of a glass substrate transmission device comprising:

disposing through holes along a first direction on the multiple driven shafts arranged parallel at intervals along the first direction, and the multiple driven shafts extend along a second direction, and the first direction and the second direction are perpendicular;

providing an infrared sensor in it and a reflection plate on both sides of the driven shafts along the first direction, and the through holes and the reflection plate are located in the propagation direction of the infrared emitted from the infrared sensor unit;

emitting the infrared by using the infrared sensor unit and receiving the reflected light emitted from the infrared sensor unit and reflected back by an obstacle; and determining the rotational synchronization of the driven shafts according to the intensity of the reflected light.

Wherein, in the step of determining the rotational synchronization of the driven shafts according to the intensity of the reflected light comprises:

determining the distance of the obstacle according, to the intensity oldie reflected light, and the stronger the intensity of the reflected light, the closer the distance of the obstacle is.

Wherein, in the step of determining the rotational synchronization of the driven shafts according to the intensity of the reflected light comprises:

storing multiple preset values of the intensity of the reflected light, and each of the preset values of the intensity of the reflected light is respectively corresponding to the intensity value of the infrared which is passing through the driven shafts. emitted from the infrared transmitter module, and reflected by the reflection plate; and determining that irate intensity value of the reflected light and the preset values of the intensity of the reflected light corresponding to the reflection plate are matched, and in the situation of match, determining that the multiple driven shafts rotate synchronously, and in the situation of mismatch, determining that the multiple driven shafts rotate asynchronously.

Wherein, in the step of in the situation of mismatch, determining that the multiple driven shafts rotate asynchronously comprises:

searching the matched preset values of the intensity of the reflected light according to the intensity value of the reflected light, and determining that the one of the driven shafts corresponding to the matched preset values of the intensity of the reflected light rotates asynchronously.

The beneficial effects of the present invention are: comparing to the conventional art, the glass substrate transmission device and the method for detecting the rotational synchronization of driven shafts use the infrared sensor unit and the reflection plate on both sides of the driven shafts such that it can detect, that if the multiple driven shafts rotate synchronously or stop rotating to avoid the glass substrate from scratch or break.

BRIEF DESCRIPTION OF THE DRAWINGS

In order to more clearly illustrate the technical solutions in the present invention. The following will simply introduce the figures in the embodiment. Obviously, the following figures are just some embodiments of the present invention. The person of ordinary skill who not pays creative work under the premise can obtain other figures based on these figures.

DETAILED DESCRIPTION OF THE PREFERRED EMBODIMENT

The following combines the drawings and the embodiments for detailed description of the present invention.

Figure 1:
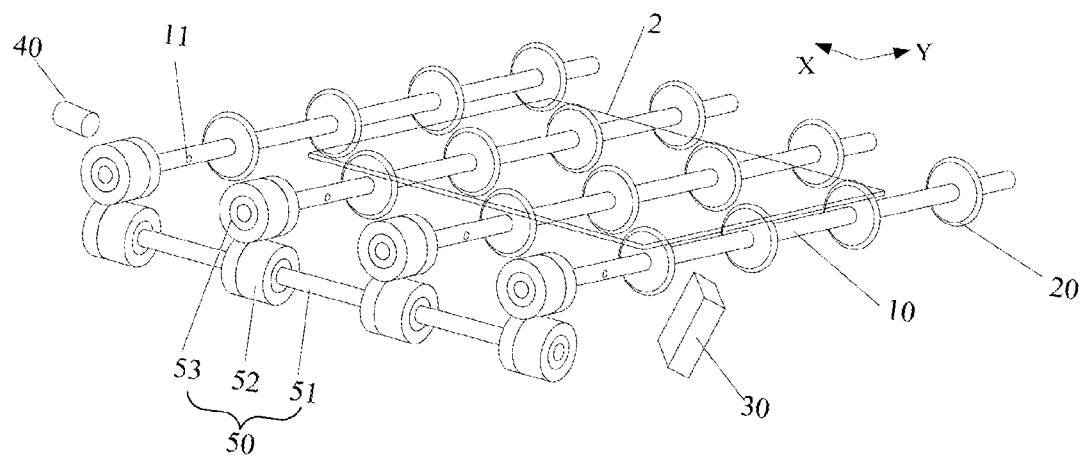
FIG. 1 is a schematic diagram of the glass substrate transmission device of the present invention.

FIG. 1 is a schematic diagram of the glass substrate transmission device of the present invention. As shown in FIG. 1, the glass substrate transmission device 1 includes multiple driven shafts 10, multiple rollers 20, a reflection plate 30 and an infrared sensor unit 40.

Wherein, the multiple driven shafts 10 are disposed parallel at intervals along a first direction X and extend along a second direction Y. Each of the driven shafts has a through hole 11. The first direction X and the second direction Y are perpendicular. The through hole 11 is used liar pass the infrared, and the size of the through hole 11 is decided according to the diameter of the driven shaft 10 and the requirement of infrared. When installing the driven shaft 10, the through holes 11 on the driven shafts 10 are aligned to form a channel for passing the infrared.

The multiple rollers 20 are fixed at intervals on the driven shafts 10 along the second direction Y. The rollers 20 are used for carrying the glass substrate 2, and rotate with the driven shaft 10 to flow the glass substrate 2. In this embodiment, the rollers 20 are made of Polyoxymethylene (POM) resin or Teflon and other low-dust and anti-static materials, and the rollers 20 flow the glass substrate 2 forward by rolling friction.

The reflection plate 30 is disposed at one side of the driven shaft 10 along the first direction X for reflecting infrared.

The infrared sensor unit 40 is disposed at the other side of the driven shaft 10 along the first direction X. The through holes 11 and the reflection plate 30 are all located at the propagation direction of the infrared of the infrared sensor unit 40. The infrared sensor unit 40 emits infrared, and receives the reflection light reflected back by an obstacle and emitted by the infrared sensor unit 40, and determine the rotational synchronization of the driven shafts 10 according to the value of the intensity of the reflected light.

Figure 2:
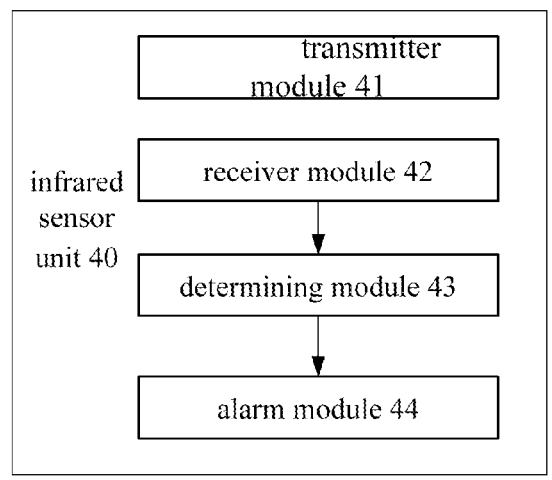
FIG. 2 is a structure schematic diagram of the infrared sensor unit 40 in FIG. 1.

FIG. 2 is a structure schematic diagram of the infrared sensor unit 40 in FIG. 1. As shown in FIG. 2, the infrared sensor unit 40 includes a transmitter module 41, a receiver module 42, a determining module 43, and an alarm module 44.

Wherein, the transmitter module 41 is for emitting the infrared, and the transmitter module 41 could be an infrared transmitter circuit. The receiver module 42 is for receiving the reflection light emitted by the transmitter module 41 and reflected back by obstacles. The receiver module 42 could he an infrared receiver module and so on.

Figure 3:
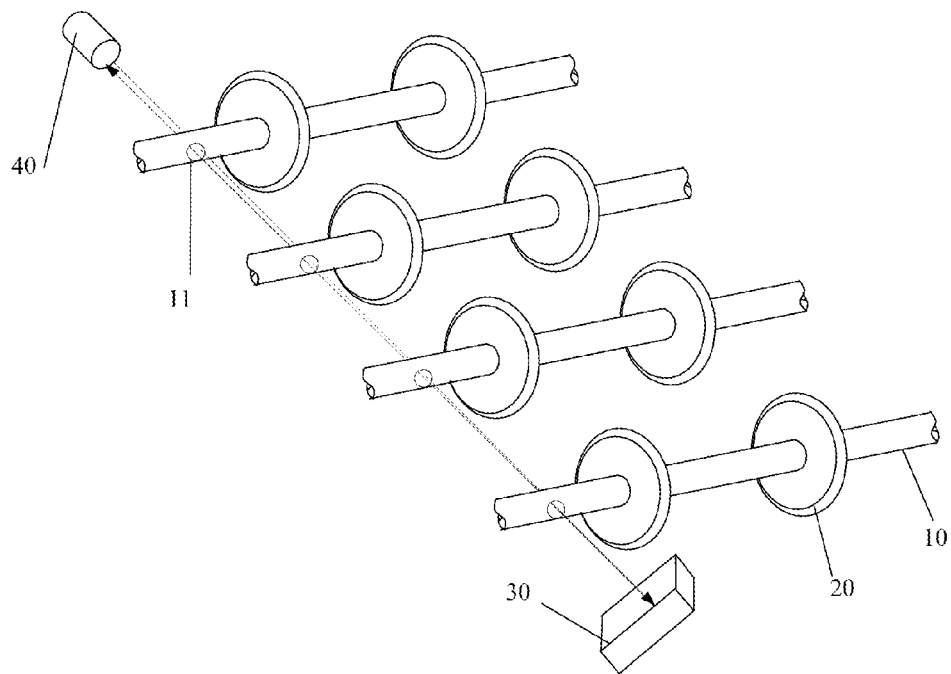
FIG. 3 is a partial enlarged diagram of the driven shafts 10 of the glass substrate transmission device rotating synchronously in FIG. 1.
Figure 4:
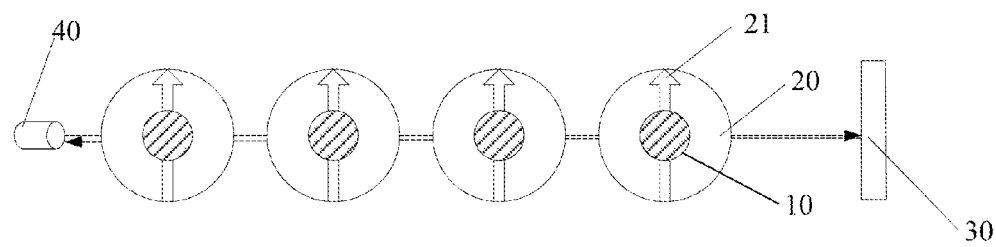
FIG. 4 is a let side view of the glass substrate transmission device in FIG. 3.

FIG. 3 is a partial enlarged diagram of the driven shaft 10 of the glass substrate transmission device rotating synchronously in FIG. 1 and FIG. 4 is a left side view of the glass substrate transmission device in FIG. 3. As shown in FIG. 3 and FIG. 4, when each of the driven shafts 10 rotates synchronously, the through holes 11 are aligned and form a channel for passing the infrared through. The infrared emitted by the infrared sensor unit 40 pass through the channel formed by the multiple through holes 11 and reflects back by the reflection plate 30 and reflects to the infrared sensor unit 40.

Figure 5:
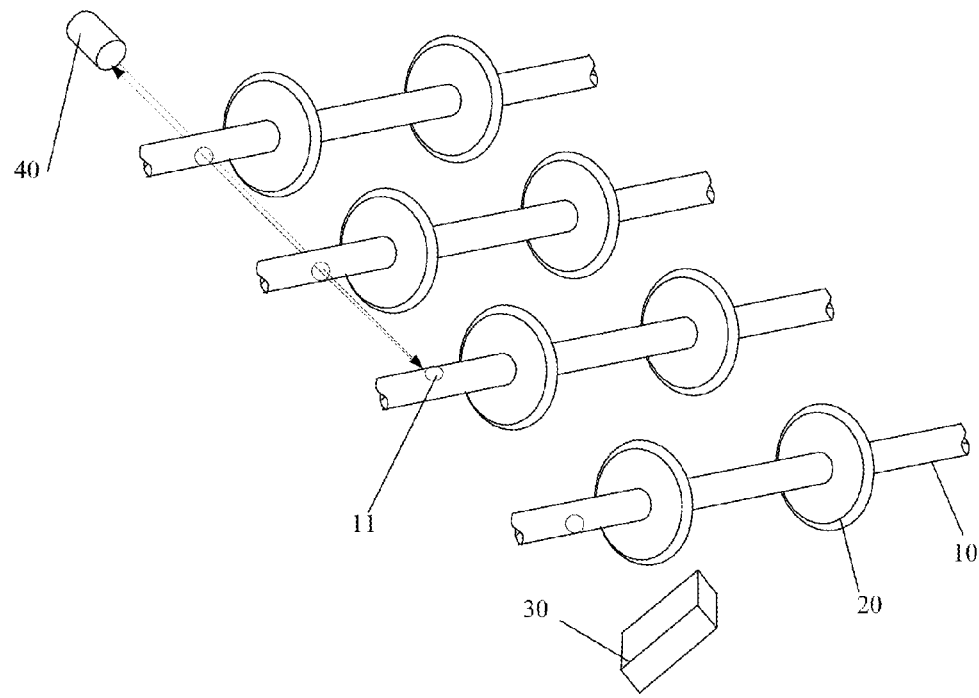
FIG. 5 is a partial enlarged diagram of the driven shafts 10 of the glass substrate transmission device rotating asynchronously in FIG. 1.
Figure 6:
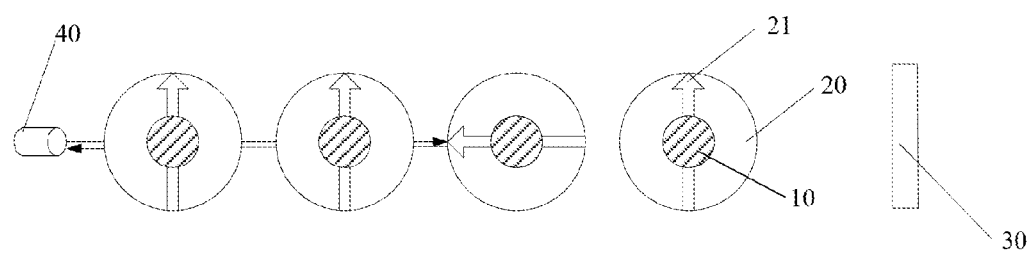
FIG. 6 is a left side view of the glass substrate transmission device in FIG. 4.

FIG. 5 is a partial enlarged diagram of the driven shaft 10 of the glass substrate transmission device rotating asynchronously in FIG. 1. FIG. 6 is a left side view of the glass substrate transmission device in FIG. 4. As shown in FIG. 5 and FIG. 6, when the multiple driven shafts 10 rotate asynchronously or one of the driven shafts 10 stops rotating, the infrared light emitted by the infrared sensor unit 40 can only pass through some of the through holes 11, and reflects back to the infrared sensor unit 40 by the driven shall 10 rotating asynchronously or stopping rotating.

As shown in FIG. 4 and FIG. 6, each of the rollers 20 further disposes a rotation mark 21. When installing the rollers 20, the rollers 20 located in the first direction X and in the same row are aligned in accordance with the rotation marks 21. Then, all the rollers 20 are fixed to the driven shafts 10 in order to determine if the multiple rollers 20 are synchronous by the naked eye.

The determining module 43 and receiver module 42 are connected. The determining module 43 is used for determining that if the multiple driven shafts 10 rotate synchronously according to the intensity of the reflected light.

The intensity of the reflected light received by the receiver module 42 changes with the change in distance of the reflecting object (i.e. obstacle). When the distance of the reflecting objects is closer, the intensity of the reflected light is stronger. When the distance of the reflecting objects is farther, the intensity of the reflected light is weaker.

The determining module 43 can determine the distance of the obstacle by the intensity of the reflected light. The stronger the intensity of the reflected light, the closer the distance of the obstacle is.

Therefore, it can determine accordingly that if one of the driven shafts 10 rotates asynchronously. It can further determine the distance of the driven shaft 10 rotating asynchronously according to the intensity of the reflected light. It also can determine that which driven shaft 10 rotates asynchronously according to different distances.

In this embodiment, the determining module 43 stores multiple preset values of the intensity of the reflected light. Each of the preset values of the intensity of the reflected light is respectively corresponding to the intensity value of the infrared which is passing through the driven shafts 10, emitted by the infrared transmitter module 40, and reflected by the reflection plate 30.

The determining module 43 determines that if the intensity value of the reflected light and the preset values of the intensity of the reflected light corresponding to the reflection plate 30 are matched. In the situation of match, the determining module 43 determines that the multiple driven shafts rotate synchronously. In the situation of mismatch, the determining module 43 determines that the multiple driven shafts rotate asynchronously.

When determining that the driven shafts 10 rotate asynchronously, the determining module 43 search the matched preset values of the intensity of the reflected light according to the intensity value of the reflected light and determine that the one of the driven shafts 10 corresponding to the matched preset values of the intensity of the reflected light rotates asynchronously. When the determining module 43 determines that the multiple driven shafts 10 rotate asynchronously, the alarm module 44 produces an alarm to customer for fixing the glass substrate transmission device 1.

Please refer to FIG. 1 again. In this embodiment, the glass substrate transmission device 1 further includes a drive unit 50. The drive unit 50 is used to drive the multiple driven shafts 10 to rotate. In this embodiment, the drive unit 50 includes a main drive shaft 51, multiple main drive wheels 52, and multiple driven wheels 53.

Wherein, the extension direction of main drive shaft 51 is perpendicular to the extension direction of the driven shafts 10. The main drive shaft 51 can rotate. The multiple driven shafts 10 are disposed at intervals along the extension direction of the main drive shaft 51. The multiple main drive wheels 52 are fixed at intervals on the main drive shaft 51 and along the extension direction of the main drive shaft 51. The main drive wheels 52 rotate with the rotation of the main drive shaft 51, and the main drive wheels 52 are magnetic. The multiple driven wheels 53 are also magnetic. Each of the driven wheels 53 is fixed at one end of the driven shaft 10 which is non-through-hole area and closed to the main drive shaft 51. The driven wheel 53 is driven by the main drive wheel 32 through magnetic coupling. Finally, it drives the driven shaft 10 to rotate.

Figure 7:
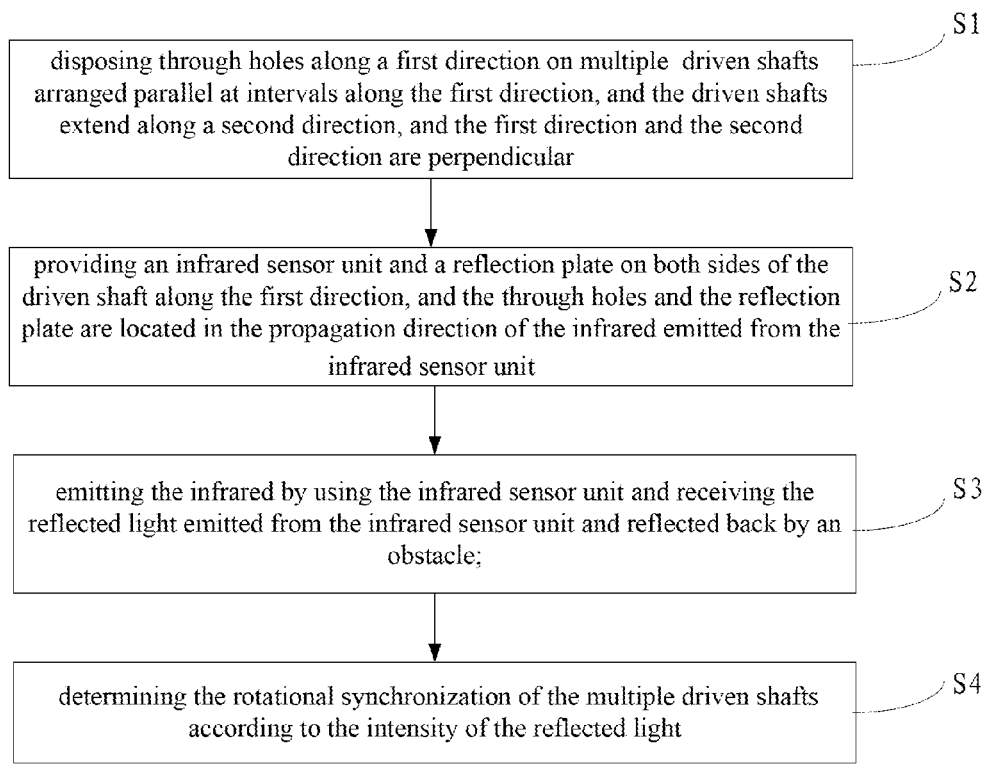
FIG. 7 is a flow chart of the method for transmitting the glass substrate of the present invention.

FIG. 7 is a flow chart of the method lot transmitting the glass substrate of the present invention. As shown in FIG. 7, the method for detecting the rotational synchronization of the driven shafts of the glass substrate transmission device comprises:

Step S1: disposing through holes along a first direction on multiple driven shafts arranged parallel at intervals along the first direction, and the driven shafts extend along a second direction, and the first direction and the second direction are perpendicular;

Step S2: providing an infrared sensor unit and a reflection plate on both sides of the driven shall along the first direction, and the through holes and the reflection plate are located in the propagation direction of the infrared emitted from the infrared sensor unit;

Step S3: emitting the infrared by using the infrared sensor unit and receiving the reflected light emitted from the infrared sensor unit and reflected back by an obstacle;

Step S4: determining the rotational synchronization of the multiple driven shafts according to the intensity of the reflected light.

Wherein, the Step S4 includes: determining the distance of the obstacle according to the intensity of the reflected light, and the stronger the intensity of the reflected light, the closer the distance of the obstacle is.

In this embodiment, the step S4 further includes: storing multiple preset values of the intensity of the reflected light, and each of the preset values of the intensity of the reflected light is respectively corresponding to the intensity value of the infrared which is passing through the driven shafts, emitted by the infrared transmitter module, and reflected by the reflection plate;

determining that if the intensity value of the reflected light and the preset values of the intensity of the reflected light corresponding to the reflection plate are matched. In the situation of match, determining that the multiple driven shafts rotate synchronously, and in the situation of mismatch, determining that the multiple driven shafts rotate asynchronously.

The step S4 further includes: searching the matched preset values of the intensity of the reflected light according to the intensity value of the reflected light and determine that the one of the driven shafts corresponding to the matched preset values of the intensity of the reflected light rotates asynchronously.

By the above way, the glass substrate transmission device and the method for detecting the rotational synchronization of driven shafts use the infrared sensor unit and the reflection plate on both sides of the driven shafts such that it can detect that if the multiple driven shafts rotate synchronously or stop rotating to avoid the glass substrate from scratch or break.

The above embodiments of the present invention are not used to limit the claims of this invention. Any use of the content in the specification or in the drawings of the present invention Which produces equivalent structures or equivalent processes, or directly or indirectly used in other related technical fields is still covered by the claims in the present invention.

What is claimed is:

1. A glass substrate transmission device comprising:
    multiple driven shafts, the multiple driven shafts are disposed parallel at intervals along a first direction and extend along a second direction, and each of the driven shafts has a through hole, and the first direction and the second direction are perpendicular;
    multiple rollers, the multiple rollers are fixed at intervals on the driven shafts along the second direction, and the multiple rollers are used for carrying a glass substrate, and rotate with the driven shaft to flow the glass substrate;
    a reflection plate disposed at one side of the driven shafts along the first direction; and
    an infrared sensor unit disposed at the other side of the driven shafts along the first direction, and the through holes and the reflection plate are located at the propagation direction of the infrared of the infrared sensor unit, and the infrared sensor unit emits the infrared and receives a reflection light reflected back by an obstacles and emitted by the infrared sensor unit, and determine the rotational synchronization of the driven shafts according to the value of the intensity of the reflected light.

2. The glass substrate transmission device according to claim 1, wherein, the infrared sensor unit comprises:
    a transmitter module used for emitting the infrared;
    a receiver module used for receiving the reflection light emitted by the transmitter module and reflected back by the obstacle; and
    a determining module connected to the receiver module and determining that if the multiple driven shafts rotate synchronously according to the intensity of the reflected light.

3. The glass substrate transmission device according to claim 2, wherein, the determining module determines the distance of the obstacle according to the intensity of the reflected light, and the stronger the intensity of the reflected light, the closer the distance of the obstacle is.

4. The glass substrate transmission device according to claim 3, wherein, the determining module stores multiple preset values of the intensity of the reflected light, and each of the preset values of the intensity of the reflected light is respectively corresponding to the intensity value of the infrared which is passing through the driven shafts, emitted by the infrared transmitter module, and reflected by the reflection plate, and the determining module determines that if the intensity value of the reflected light and the preset values of the intensity of the reflected, light corresponding to the reflection plate are matched, and in the situation of match, the determining module determines that the multiple driven shafts rotate synchronously, and in the situation of mismatch, the determining module determines that the multiple driven shafts rotate asynchronously.

5. The glass substrate transmission device according to claim 4, wherein, when determining that the multiple driven shafts rotate asynchronously, the determining module searches the matched preset values of the intensity of the reflected light according to the intensity value of the reflected light, and determines that the one of the driven shafts corresponding to the matched preset values of the intensity of the reflected light rotates asynchronously.

6. The glass substrate transmission device according to claim 2, wherein, the infrared sensor unit further comprises an alarm module, and when the determining module determines that the multiple driven shafts rotate asynchronously, the alarm module produces an alarm.

7. The glass substrate transmission device according to claim 1, wherein, the size of the through hole is decided according to the diameter of the driven shaft and the requirement of the infrared.

8. A glass substrate transmission device comprising:
multiple driven shafts, the multiple driven shafts are disposed parallel at intervals along a first direction and extend along a second direction, and each of the driven shafts has a through hole, and the first direction and the second direction are perpendicular;
multiple rollers, the multiple rollers are fixed at intervals on the driven shafts along the second direction, and the multiple rollers are used for carrying a glass substrate, and rotate with the driven shall to flow the glass substrate;
a drive unit, used to drive the multiple driven shafts to rotate;
a reflection plate disposed at one side of the driven shafts along the first direction; and
an infrared sensor unit disposed at the other side of the driven shafts along the first direction, and the through holes and the reflection plate are located at the propagation direction of the infrared of the infrared sensor unit, and the infrared sensor unit emits the infrared and receives a reflection light reflected back by an obstacles and emitted by the infrared sensor unit, and determine the rotational synchronization of the driven shafts according to the value of the intensity of the reflected light.

9. The glass substrate transmission device according to claim 8, wherein, the infrared sensor unit comprises:
a transmitter module used for emitting the infrared;
a receiver module used for receiving the reflection light emitted by transmitter module and reflected back by the obstacle; and
a determining module connected to the receiver module and determining that if the multiple driven shafts rotate synchronously according to the intensity of the reflected light.

10. The glass substrate transmission device according to claim 9, wherein, the determining module determines the distance of the obstacle according to the intensity of the reflected light, and the stronger the intensity of the reflected light, the closer the distance of the obstacles is.

11. The glass substrate transmission device according to claim 10, wherein, the determining module stores multiple preset values of the intensity of the reflected light, and each of the preset values of the intensity of the reflected light is respectively corresponding to the intensity value of the infrared which is passing through the drivers shafts, emitted by the infrared transmitter nodule, and reflected by the reflection plate, and the determining module determines that if the intensity value of the reflected light and the preset values of the intensity of the reflected light corresponding to the reflection plate are matched, and in the situation of match, the determining module determines that the multiple driven shafts rotate synchronously, and in the situation of mismatch, the determining module determines that the multiple driven shafts rotate asynchronously.

12. The glass substrate transmission in device according to claim 11, wherein, when determining that the multiple driven shafts rotate asynchronously, the determining module searches the matched preset values of the intensity of the reflected light according to the intensity value of the reflected light, and determines that the one attic driven shafts corresponding to the matched preset values of the intensity of the reflected light rotates asynchronously.

13. The glass substrate transmission device according to claim 9, wherein, the infrared sensor unit further comprises an alarm module, and when the determining module determines that the multiple driven shafts rotate asynchronously, the alarm module produces an alarm.

14. The glass substrate transmission device according to claim 8, wherein, the drive unit comprises:
a main drive shaft, and the main drive shaft is rotatable;
multiple main drive wheels having magnetism, and the multiple main drive wheels are fixed at intervals on the main drive shaft and along the extension direction of the main drive shaft, and the main drive wheels rotate with the rotation of the main drive shaft; and
multiple driven wheels having magnetism, and each of the driven wheels is fixed at one end of the driven shaft which is non-through-hole area and closed to the main drive shall, and the driven wheels are driven to rotate by the main drive wheels through magnetic coupling, and the driven wheels drive the driven shafts to rotate.

15. The glass substrate transmission device according to claim 14, wherein, the multiple driven shafts are disposed at intervals along the extension direction of the main drive shaft and the extension direction of the driven shafts is perpendicular to the extension direction of the main drive shaft.

16. A method for detecting the rotational synchronization of multiple driven shafts of a glass substrate transmission device comprising:
disposing through holes along a first direction on the multiple driven shafts arranged parallel at intervals alone the first direction and the multiple driven shafts extend along a second direction, and the first direction and the second direction are perpendicular;
providing an infrared sensor unit and a reflection plate on both sides of the driven shafts along the first direction, and the through holes and the reflection plate are located in the propagation direction of the infrared emitted from the infrared sensor unit;
emitting the infrared by using the infrared sensor unit and receiving the reflected light emitted from the infrared sensor unit and reflected back by an obstacle; and
determining the rotational synchronization of the multiple driven shafts according to the intensity of the reflected light.

17. The method for detecting the rotational synchronization of multiple driven shafts of a glass substrate transmission device according to claim 16, wherein, in the step of determining the rotational synchronization of the driven shafts according to the intensity of the reflected light comprises:

determining the distance of the obstacle according to the intensity of the reflected light, and the stronger the intensity of the reflected light the closer the distance of the obstacle is.

18. The method for detecting the synchronization of multiple driven shafts of a glass substrate transmission device according to claim 17, wherein, in the step of determining the rotational synchronization of the driven shafts according to the intensity of the reflected light comprises:

storing multiple preset values of the intensity of the reflected light, and each of the preset values of the intensity of the reflected light is respectively corresponding to the intensity value of the infrared which is passing through the driven shafts, emitted from the infrared transmitter module, and reflected by the reflection plate; and determining that if the intensity value of the reflected light and the preset values of the intensity of the reflected light corresponding to the reflection plate are matched, and in the situation of match, determining that the multiple driven shafts rotate synchronously, and in the situation of mismatch, determining that the multiple driven shafts rotate asynchronously.

19. The method for detecting, the rotational synchronization of multiple driven shafts of a glass substrate transmission device according to claim 18, wherein, in the step of in the situation of mismatch, determining that the multiple driven shafts rotate asynchronously comprises:

searching the matched preset values of the intensity of the reflected light according to the intensity value of the reflected light and determining that the one of the driven shafts corresponding to the matched preset values of the intensity of the reflected light rotates asynchronously.

* * * * *